United States Patent
Bocek et al.

(10) Patent No.: US 8,459,102 B2
(45) Date of Patent: Jun. 11, 2013

(54) DIGITAL Q CONTROL FOR ENHANCED MEASUREMENT CAPABILITY IN CANTILEVER-BASED INSTRUMENTS

(75) Inventors: Dan Bocek, Goleta, CA (US); Jason Cleveland, Ventura, CA (US)

(73) Assignees: Oxford Instruments PLC, Oxfordshire (GB); Oxford Instruments AFM Inc., Pleasanton, CA (US)

( * ) Notice: Subject to any disclaimer, the term of this patent is extended or adjusted under 35 U.S.C. 154(b) by 0 days.

(21) Appl. No.: 13/280,549

(22) Filed: Oct. 25, 2011

(65) Prior Publication Data

US 2012/0216322 A1    Aug. 23, 2012

Related U.S. Application Data

(60) Continuation of application No. 12/140,836, filed on Jun. 17, 2008, now Pat. No. 8,042,383, which is a division of application No. 11/621,914, filed on Jan. 10, 2007, now Pat. No. 7,387,017, which is a division of application No. 10/926,787, filed on Aug. 25, 2004, now Pat. No. 7,165,445.

(60) Provisional application No. 60/497,761, filed on Aug. 25, 2003.

(51) Int. Cl.
*G01B 5/28*     (2006.01)
*G01Q 60/24*   (2010.01)
*G01Q 30/06*   (2010.01)

(52) U.S. Cl.
USPC .................................. 73/105; 850/11; 850/33

(58) Field of Classification Search
USPC ..................... 73/105; 700/280; 850/11, 33
See application file for complete search history.

(56) References Cited

U.S. PATENT DOCUMENTS

| 5,028,887 A | 7/1991 | Gilmore |
|---|---|---|
| 5,467,294 A | 11/1995 | Hu et al. |
| 5,554,987 A | 9/1996 | Ooga |
| 6,189,374 B1 | 2/2001 | Adderton et al. |
| 6,778,138 B2 | 8/2004 | Purdy et al. |
| 2002/0175677 A1 | 11/2002 | Proksch et al. |
| 2004/0056653 A1 | 3/2004 | Bocek et al. |
| 2004/0075428 A1 | 4/2004 | Proksch et al. |
| 2004/0206166 A1 | 10/2004 | Proksch et al. |

*Primary Examiner* — Daniel Larkin
(74) *Attorney, Agent, or Firm* — Law Offices of Scott C. Harris, Inc.

(57) ABSTRACT

A digital system for controlling the quality factor in a resonant device. The resonant device can be a a device that includes a cantilever within its system, such as an atomic force microscope. The quality factor can be digitally controlled to avoid noise effect in the analog components. A direct digital synthesizer implemented in a way that provides access to the output of the phase accumulator. That output is a number which usually drives a lookup table to produce a cosine or sine output wave. The output wave is created, but the number is also adjusted to form a second number that drives a second lookup table to create an adjustment factor to adjust the output from the cosine table. The adjusted digital signal than drives a DA converter which produces an output drive for the cantilever.

18 Claims, 5 Drawing Sheets

DIGITAL Q CONTROL FOR ENHANCED MEASUREMENT CAPABILITY IN CANTILEVER-BASED INSTRUMENTS

CROSS-REFERENCE TO RELATED APPLICATION

This application is a continuation application of U.S. Ser. No. 12/140,836 filed Jun. 17, 2008, now U.S. Pat. No. 8,042,383 issued Oct. 25, 2011, which is a divisional of U.S. Ser. No. 11/621,914 filed Jan. 10, 2007, now U.S. Pat. No. 7,387,017, issued Jun. 17, 2008, which is a divisional application of U.S. Ser. No. 10/926,787 filed Aug. 25, 2004, now U.S. Pat. No. 7,165,445, issued Jan. 23, 2007, which claims benefit of the priority of U.S. Provisional Application Ser. No. 60/497,761 filed Aug. 25, 2003 and entitled "Digital Q Control for Enhanced Measurement Capability in Cantilever-Based Instruments".

BACKGROUND

Any mechanically driven resonant system has an inherent "quality factor" or "Q", that defines some aspect of the way the resonant system reacts to stimuli. The quality factor of certain resonant systems can be controlled and/or adjusted, for example electronically.

One exemplary mechanically-driven resonant system that can be Q-controlled is the cantilever portion of a scanning probe force microscope. When the microscope is operating in its AC mode, the driving amplitude and driving phase of the device can be adjusted. The effect of such an adjustment is to make the cantilever system behave as if it had a higher or lower Q then would naturally occur within the system.

FIG. 1 illustrates how an analog based implementation of Q control can be carried out. Circuit 100 is part of a control system for an atomic force microscope. A cantilever 105 has a tip 110 that contacts an item of interest. The cantilever is driven in AC mode via a piezoelectric based actuator 115. In a system with an optical detector, a laser or other optical source 120 projects a laser beam 122 on the cantilever. A reflection 124 based onto the projected laser beam is reflected by a mirror 125 to a detector 130 that produces an output signal indicative of the position of the cantilever tip. For example, the detector may include, as shown, a split position detector 132 that detects deviation from its center. The output signal 133 of the detector represents the amount by which the cantilever tip has changed position. The signal 133 is sent to a lock-in amplifier 135 which also receives the output of a function generator 140 that drives the actuator 115.

In order to change the effective Q of the system, the output signal 133 is phase shifted by a variable phase shifter 145 which produces a 90 degree phase shift, and then multiplied by an amplitude gain by gain amplifier 150. The amplitude gain may be positive in order to damp the Q, and negative to enhance the Q. The resultant Q adjusting signal 155 is added by an adder 160, to the driving wave formed by the function generator 140.

This analog phase shifting circuit includes analog components which may be frequency dependent. Moreover, the resonant frequency may be based on characteristics of the specific cantilever, and the way the cantilever is used. Therefore, changing to a new cantilever may change the resonant frequency of the system. Also, characteristics of the medium in which the cantilever is used, such as in air versus in fluid, will change the resonant frequency of the system. This resonant frequency change must be compensated in the phase shift circuit 145 to insure a 90 degree phase shift between the signal from the cantilever position detector and the signal 155 that is added to the drive.

The phase shifter 145 is shown as an adjustable phase shifter. This kind of Q adjustment usually requires changing a manually-adjustable value, to change the circuit values of some aspect of the analog phase shift. This adjustment is made to ensure a 90 degree phase shift for the new resonant frequency.

Another possible disadvantage of the analog phase shift circuit is that analog phase shifters typically operate only over a limited range of frequencies. In order to phase shift a wideband signal, several different phase shifters may be used in tandem.

The analog implementation also requires a multiplier to effect the analog gain. For example, this may be a voltage controlled analog amplifier, or a digitally controlled analog amplifier. However, circuits of this type may add noise to the output signal 133, and thereby corrupt the effectiveness of the Q control.

SUMMARY

The present system teaches a new kind of Q control which is provided in recognition of the features noted above. A new, digitally-operating Q control is defined. In one aspect, a system is described which allows cantilever resonant frequency changes without requiring an adjustment of the circuit. The system may be relatively noise insensitive, and may operate without adding any noise to the Q control scheme.

BRIEF DESCRIPTION OF THE DRAWINGS

These and other aspects will now be described in detail with reference to the accompanying drawings, wherein.

DETAILED DESCRIPTION

Figure 1:
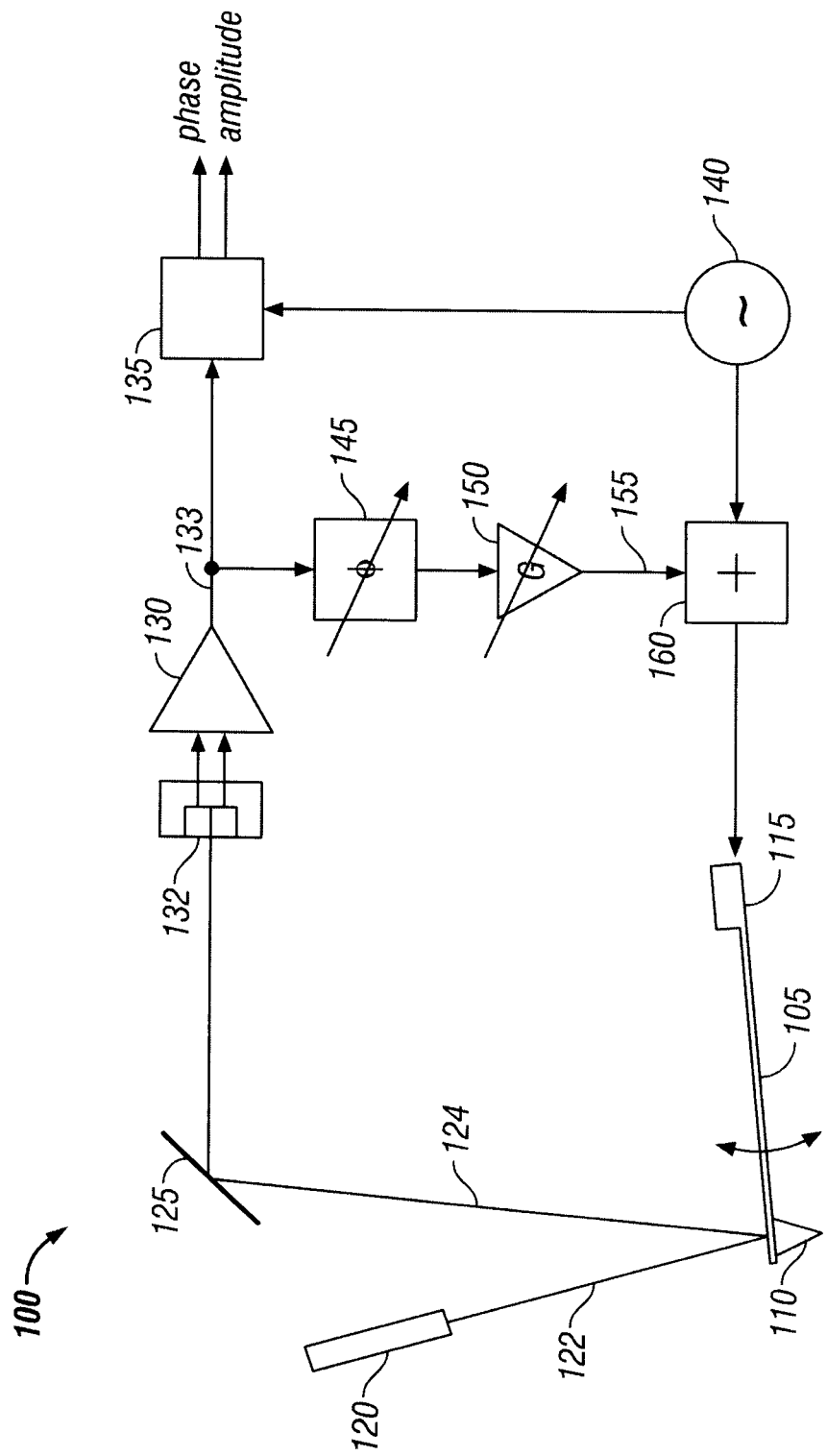
FIG. 1 shows a block diagram of an analog control of Q.
Figure 2:
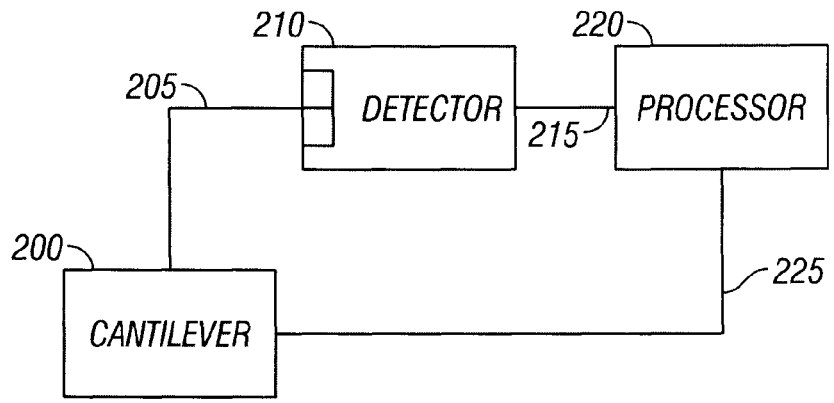
FIG. 2 shows a block diagram of a digital system of Q control.

FIG. 2 shows an embodiment where the calculation of vectors to effect Q control is carried out in a processor 220.

The cantilever system 200 produces a signal 205 which is detected in a detector 210. This signal and detection may be optical as in the first embodiment. The output 215 of the detector is received by a processor 220. The processor produces an output 225 which forms the driving output to the cantilever 200. Certain A/D conversions and D/A conversions are omitted from the diagram of FIG. 2.

In one embodiment, usable with the system of FIG. 2, the processor 220 is used to calculate the amplitude and phase of motion of the cantilever. This amplitude and phase is used to calculate a vector that is added to the normal driving vector of the cantilever. The output signal 225 therefore includes a combination of the driving signal as corrected for the desired Q control.

In this embodiment, the processor 220 may include or be formed from a "direct digital synthesizer" for the mechanically driven system 200.

A direct digital synthesizer operates by digitally storing the points of a waveform to be used, in digital format, and then recalling those points to generate the waveform. The rate at which the synthesizer completes one waveform then governs the frequency. As the phase advances, this also corresponds to advances in the waveform. Phase parts with higher numbers represent points that are further along the waveform.

The digital number representing the phase is held in a phase accumulator. This number is increased at regular intervals until the limit, after which the number resets and starts counting from zero again.

The phase is converted into a digital representation of the waveform using a waveform map. This is a memory which stores a number corresponding to the voltage required for each value of phase on the waveform. This may be a sine or cosine lookup table. The digital numbers coming from the sine lookup table are converted into an analog voltage using a D/A converter (DAC). This signal is filtered to remove any unwanted signals and amplified to give the required level as necessary.

The signal update may be recalculated once per interrupt. This requires recalculation and re-application of the vector.

The system described above may operate properly, but requires a substantial amount of complicated vector calculations. This may require more processor power or a larger processor to carry out the calculation.

Figure 3:
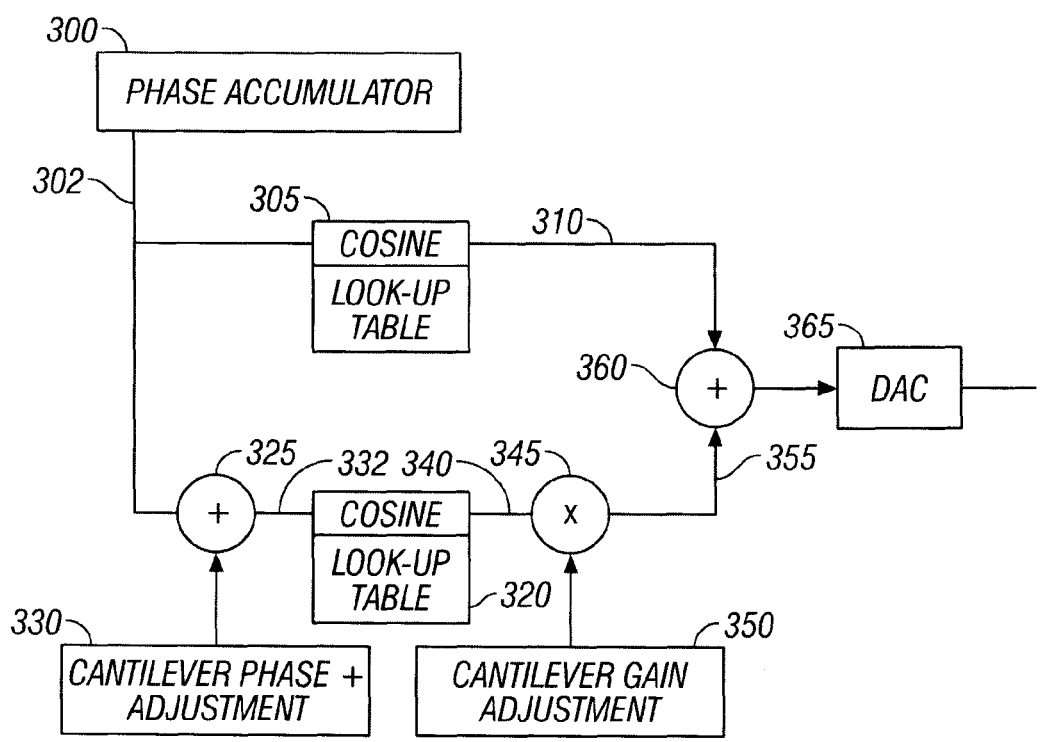
FIG. 3 shows a block diagram of another digital system of Q control.
Figure 4:
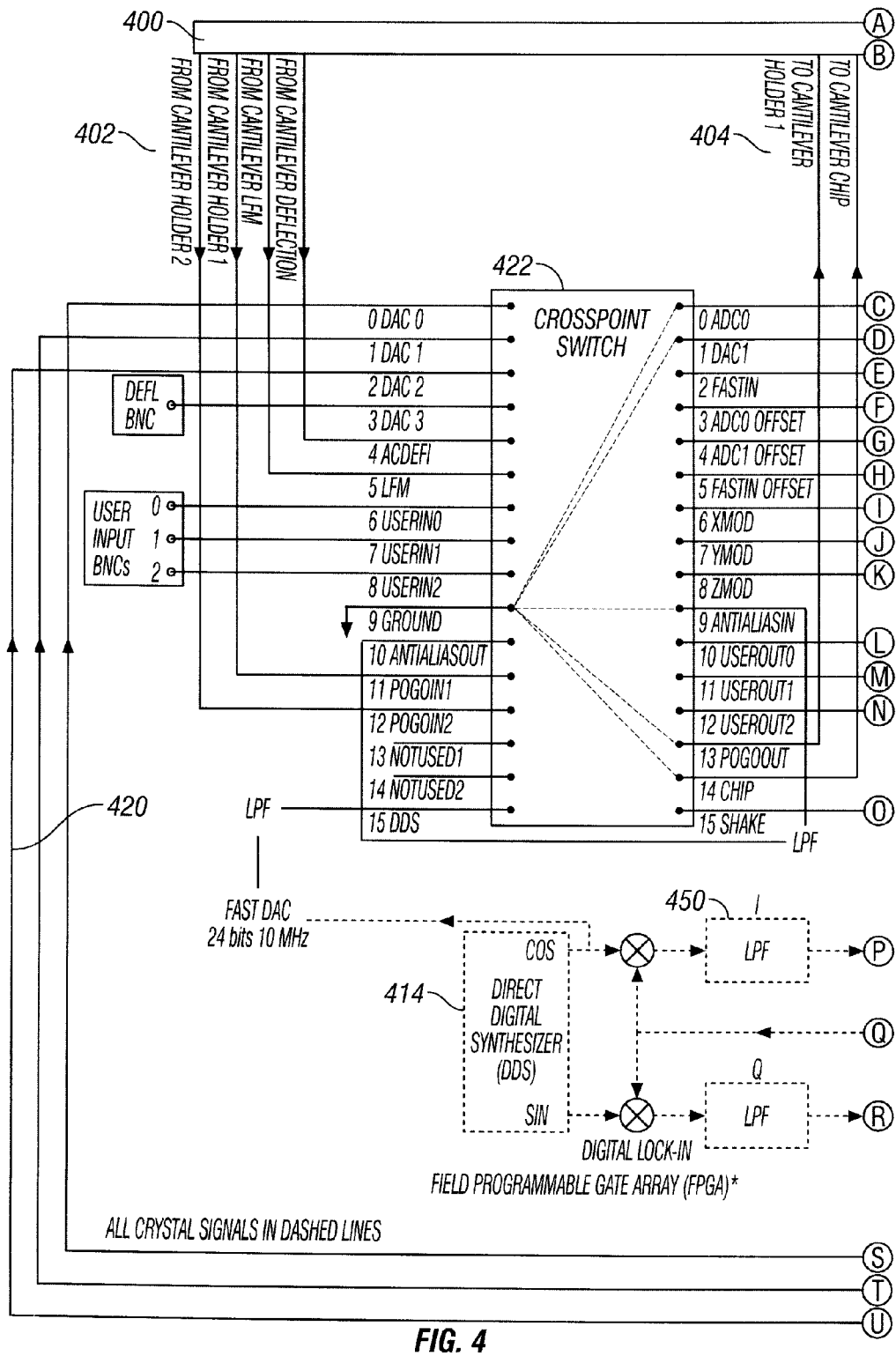
FIG. 4 shows a more detailed diagram of the digital system of Q control.
Figure 4:
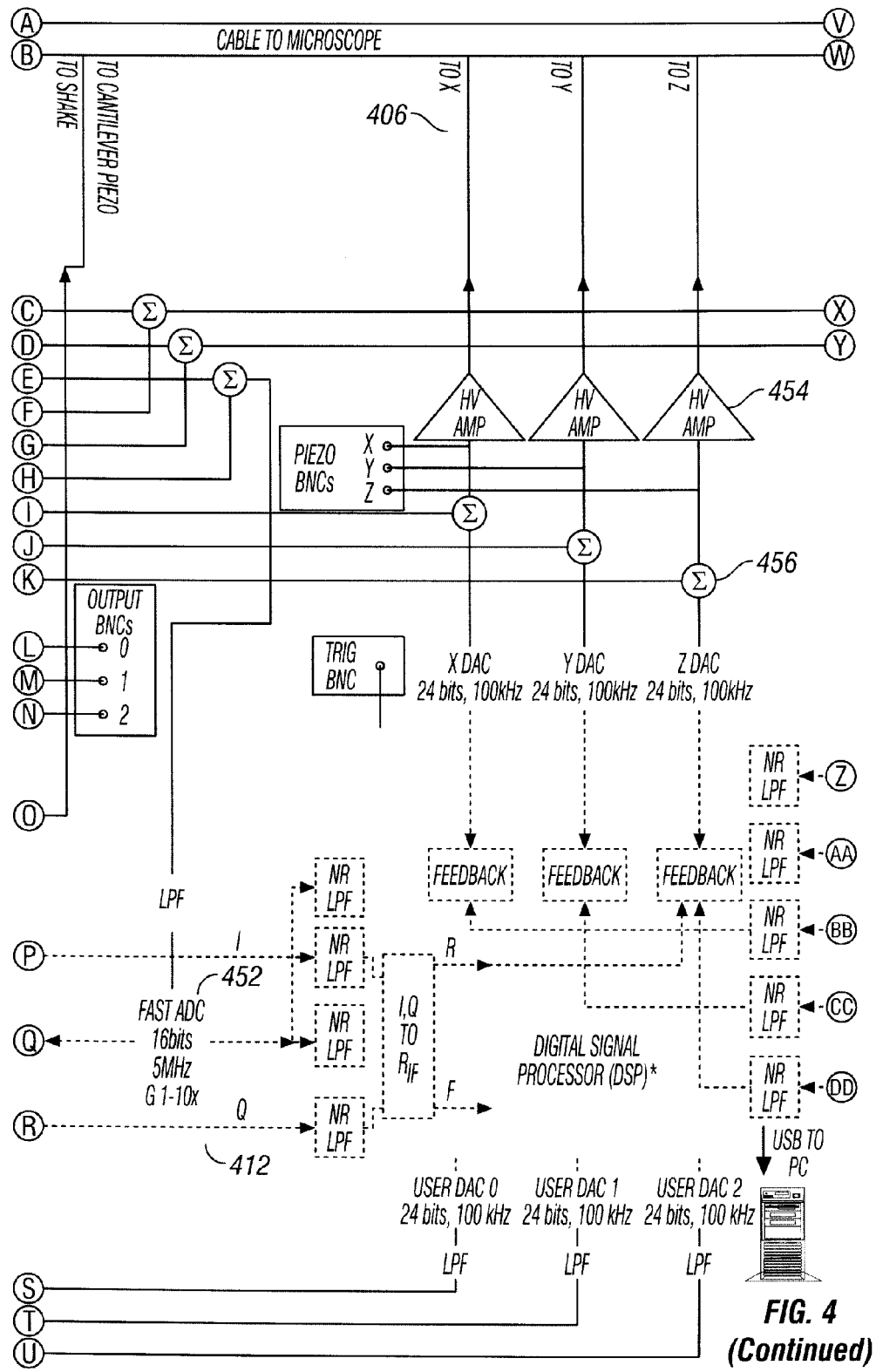
Figure 4:
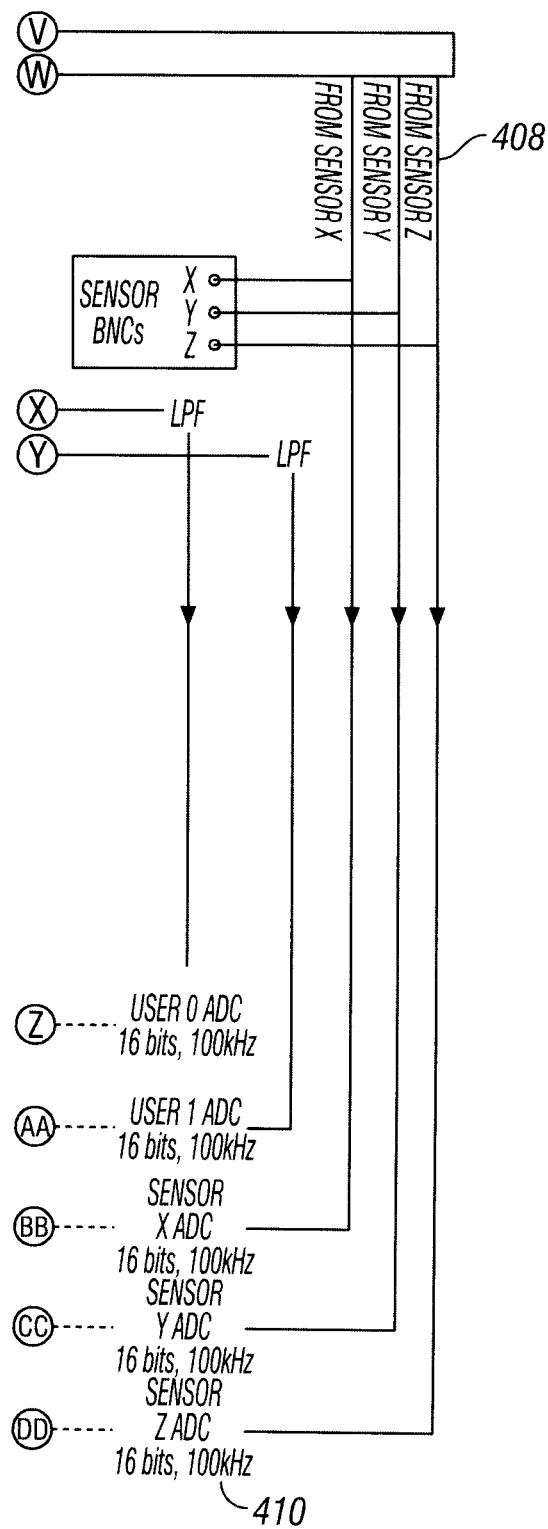

FIGS. 3 and 4 show an alternative approach. FIG. 3 shows a block diagram of the controller for the mechanically driven resonant system, and FIG. 4 shows more details of that controller. The controller is also disclosed in our co-pending provisional application Ser. No. 10/288,877, the contents of which are incorporated herein by reference. Specifically, this system allows a very simple calculation, in place of the complicated vector mathematics. That simple calculation can be done in the time domain.

In the embodiment of FIGS. 3 and 4, the direct digital synthesizer is implemented in a programmable device, such as a field programmable gate array.

The direct digital synthesizer includes a phase accumulator register shown as 300. That forms an index 302 to cosine lookup table 305 that produces the output driving signal 310 which normally drives the cantilever 200. The direct digital synthesizer is configured in a way such that access to the output of the phase accumulator becomes available. For example, the DDS may be configured in a programmable array device. In this embodiment, the phase accumulator output 302 is also sent to a second, cosine lookup table 320, e.g., one which is substantially identical to the cosine lookup table 305. A digital adder 325 is used to add a cantilever phase adjustment value 330 to the lookup index 302. This creates a compensated value 332. That compensated value 332 forms the phase argument to the second cosine table 320.

The compensation operation is simple, since the index 302 simply represents a number, and can be easily phase-adjusted prior to lookup by simply adding a compensation to the index 302. No vector operations become necessary.

The output 340 of the second cosine table is then multiplied by a cantilever gain adjustment value 350, using digital multiplier 345. The gain adjustment 350 represents the damping gain for the Q adjustment.

The output forms a representation 355 that is digital, but in the time domain. The reference numeral 355 represents the vector that needs to be added to the main drive signal 310, to achieve the desired damping result. The drive signal 310 is thereby adjusted by the compensating signal using the digital adder 360.

The output feeds a D/A converter 365 which forms the output for driving the cantilever.

FIG. 4 shows additional details, including the digital system of Q control of FIG. 3 implemented within a field programmable gate array. FIG. 4 shows the cable 400 to the microscope including its different parts. These parts including the first signals 402 from a cantilever, second signals 404 to the cantilever, as well as signals 406 which include a drive controlling the z position of the cantilever. Each of these signals may be summed at node 456, prior to amplification by 454. Signals 408 include a signal from an optional cantilever sensor, and pass through A/D converter blocks 410 before being sent to the digital signal processor 412. The field programmable gate array includes filters and a direct digital synthesizer 414 as described above. The device also includes low pass filters 450, a fast A/D converter 452, within the field programmable gate array. The device also includes amplifiers such as 454, as well as other associated circuitry. The output signals 420 may be connected to the drive 406 to the cantilever, via the crosspoint switch 422.

Although only a few embodiments have been disclosed in details above, other modifications are possible. For example, while this disclosure described the two cosine tables as being identical, they can be different by an amount related to a desired adjustment. Moreover, they can be other kinds of tables, such as sine tables, or the like.

All such modifications are intended to be encompassed within the following claims.

What is claimed is:

1. A system for driving a cantilever of an atomic force microscope, comprising:
    a first lookup table, driven by a value indicative of a phase of said atomic force microscope, to create a first sinusoidal output driving signal for said atomic force microscope;
    a second lookup table, to create a second sinusoidal output driving signal for said atomic force microscope, driven by a second signal;
    a first adder, configured to receive said value indicative of the phase of said atomic force microscope, and to add a cantilever phase adjustment value to said value to create said second signal which drives said second lookup table, wherein said first adder operates to create said second signal without any vector operations; and
    a digital adder, creating a drive signal for driving the cantilever, by adding said first and second sinusoidal outputs.

2. The system as in claim 1, further comprising an accumulator maintaining information indicative of a current phase of the cantilever, to create said value.

3. The system as in claim 2, wherein said first and second sinusoidal output driving signals are cosine signals that are determined based on the value.

4. The system as in claim 2, wherein said first lookup table and said accumulator are part of a direct digital synthesizer.

5. The system as in claim 1, further comprising a digital multiplier, receiving said second sinusoidal output driving signal, and multiplying said second sinusoidal output driving signal by a gain adjustment value, to create a gain adjusted signal, and wherein said gain adjusted signal is sent to said digital adder.

6. The system as in claim 1, further comprising a D/A converter, receiving an output of said digital adder, and creating an analog drive signal for driving the cantilever based on said output of said digital adder.

7. The system as in claim 6, further comprising the cantilever, receiving said analog drive signal, wherein said cantilever is moved based on said analog drive signal.

8. The system as in claim 1, wherein said second lookup table has substantially the same content as said first lookup table.

9. The system as in claim 1, wherein said first and second lookup tables and said digital adder are part of a direct digital synthesizer that includes a phase accumulator that creates said value indicative of phase, and said direct digital synthesizer is implemented such that output access to said phase accumulator is available.

10. The system as in claim 9, wherein said direct digital synthesizer is implemented in programmable logic.

11. A method for driving a cantilever of an atomic force microscope, comprising:
   creating a first sinusoidal output driving signal for said atomic force microscope by applying a value indicative of a phase of the atomic force microscope to a first lookup table;
   adding a cantilever phase adjustment value to said value to create a second signal, said adding carried out without any vector operations;
   creating a second sinusoidal output driving signal for said atomic force microscope, by applying said second signal to a second lookup table; and
   creating a drive signal for driving the cantilever, by digitally adding said first and second sinusoidal outputs.

12. The method as in claim 11, further maintaining information indicative of the current phase of the cantilever, to create said value.

13. The method as in claim 12, wherein said first and second sinusoidal output driving signals are cosines based on the value.

14. The method as in claim 11, further comprising digitally multiplying said second sinusoidal output driving signal by a gain adjustment value, to create a gain adjusted signal, and wherein said gain adjusted signal is used for said creating a drive signal.

15. The method as in claim 11, further comprising D/A converting an output of said creating a drive signal, and creating an analog drive signal for driving the cantilever based on said D/A converting.

16. The method as in claim 11, wherein said first and second lookup tables are each part of a direct digital synthesizer.

17. The method as in claim 11, wherein said second lookup table has substantially the same content as said first lookup table.

18. The method as in claim 11, further comprising driving the cantilever, using said analog drive signal, wherein said cantilever is driven to move moved based on said analog drive signal.

\* \* \* \* \*